(12) United States Patent
Wyremba (10) Patent No.: US 11,214,205 B2
(45) Date of Patent: Jan. 4, 2022

(54) DEVICE FOR REDUCING TYRE NOISE (71) Applicant: Christian Wyremba, Graz (AT)

(72) Inventor: Christian Wyremba, Graz (AT)

( * ) Notice: Subject to any disclaimer, the term of this patent is extended or adjusted under 35 U.S.C. 154(b) by 0 days.

(21) Appl. No.: 17/287,673

(22) PCT Filed: Jun. 5, 2019

(86) PCT No.: PCT/AT2019/060185
§ 371 (c)(1),
(2) Date: Apr. 22, 2021

(87) PCT Pub. No.: WO2020/082098
PCT Pub. Date: Apr. 30, 2020

(65) Prior Publication Data
US 2021/0309165 A1    Oct. 7, 2021

(30) Foreign Application Priority Data

Oct. 24, 2018  (AT) ............................ A 60191/2018

(51) Int. Cl.
*B60R 13/08* (2006.01)
*B62D 35/02* (2006.01)

(52) U.S. Cl.
CPC .......... *B60R 13/0861* (2013.01); *B62D 35/02* (2013.01)

(58) Field of Classification Search
CPC . B60R 13/08; B60R 13/0815; B60R 13/0861; B62D 35/02
USPC ............................................... 296/1.07, 39.3
See application file for complete search history.

(56) References Cited

U.S. PATENT DOCUMENTS

2014/0159414 A1* 6/2014 Vaughn, Jr. ......... B60R 13/0861
296/39.3
2014/0175825 A1* 6/2014 Shimanaka ......... B60R 13/0861
296/39.3

FOREIGN PATENT DOCUMENTS

| DE | 19729804 | 1/1999 |
|----|----------|--------|
| EP | 0680866 | 11/1995 |
| JP | 2017105374 | 6/2017 |

OTHER PUBLICATIONS

International Search Report and Written Opinion issued in International Application No. PCT/AT2019/0160185 dated Dec. 8, 2019.

* cited by examiner

*Primary Examiner* — Jason S Daniels
(74) *Attorney, Agent, or Firm* — Workman Nydegger (57) ABSTRACT

A device for reducing a rolling noise of a vehicle having at least one tire, the tire rolling on a roadway on a tire contact patch, wherein the device comprises at least one sound absorption element attached to the vehicle in front of, behind and/or laterally of the tire contact patch in the direction of travel (F) of the vehicle and having at least one resonance frequency and a curved first absorber membrane facing the tire contact patch, wherein the entire first absorber membrane is oriented normally to a direction of sound propagation (S) emanating from the tire contact patch, and the sound absorption element is located at a distance from the tire contact patch which corresponds to a multiple of half a wavelength (λ) assigned to the resonance frequency.

15 Claims, 6 Drawing Sheets

DEVICE FOR REDUCING TYRE NOISE

The present application is a U.S. National Stage of International Application No. PCT/AT/2019/060185, filed on Jun. 5, 2019, designating the United States and claiming the priority of Austrian Patent Application No. A60191/2018 filed with the Austrian Patent Office on Oct. 24, 2018. All of the aforementioned applications are incorporated herein in their respective entireties by this reference.

A device for reducing a rolling noise of a vehicle having at least one tire, the tire rolling on a roadway on a tire contact patch.

In the field of vehicle manufacturing, there is a constant need of rendering vehicles quieter in order to meet increasingly restrictive licensing regulations with regard to noise emissions of vehicles and, in general, of reducing the noise pollution of the environment that is caused by traffic. To meet those objectives, a number of technologies have been developed in recent years, which, for example, seek to dampen the engine noise of an internal combustion engine, to improve the sound absorption of noise protection walls, to develop low-noise asphalt mixtures, or to reduce noise emissions from the exhaust pipe. Because of the successes that have been achieved in those areas, the rolling noise of the tires of a vehicle now exceeds the other noise sources that occur when driving, especially in higher speed ranges. Because of this, it is necessary to install noise protection walls on motorways, for example. In the case of rail vehicles, the rolling noise of the tires is particularly annoying, as it is caused by the friction of a metallic tire on a metallic rail and thus occurs in a very high frequency range and exhibits a high acoustic power.

The rolling noise arises on a tire contact patch on which the tire rests or, respectively, rolls on the roadway and from which the rolling noise spreads along a direction of sound propagation. Various methods of reducing the rolling noise are known from the prior art. For motor vehicles, tires are known, for example, which have a particularly low rolling noise due to their profile design. However, such tires involve the disadvantage that these special profiles generally have a negative impact on the grip of the tires and thus reduce driving safety.

The European patent application EP 0 769 421 A1 discloses a device for reducing the noise of the tire/roadway. At one or both ends of a wheel casing facing the surface of the roadway, the device comprises a flexible skirt made of an elastic, rubber-like material with cavities open toward the road surface.

It is the object of the present invention to form a device for reducing a rolling noise which, in comparison to the prior art, exhibits an improved reduction in rolling noise.

According to the invention, the present object is achieved in that the device comprises at least one sound absorption element attached to the vehicle in front of and/or behind the tire contact patch in the direction of travel of the vehicle and having a resonance frequency and a curved first absorber membrane facing the tire contact patch, wherein essentially the entire first absorber membrane is oriented normally to a direction of sound propagation emanating from the tire contact patch, and the sound absorption element is located at a distance from the tire contact patch which corresponds to a multiple of half a wavelength assigned to the resonance frequency.

The device according to the invention for reducing a rolling noise of a vehicle having at least one tire comprises at least one sound absorption element attached to the vehicle in front of, behind and/or laterally of the tire contact patch in the direction of travel of the vehicle. The sound absorption element has at least one resonance frequency, which is preferably selected in relation to the frequency range of the rolling noise which is to be dampened. Furthermore, the sound absorption element has a curved first absorber membrane. Essentially the entire first absorber membrane is oriented normally to a direction of sound propagation emanating from the tire contact patch. The sound absorption element is located at a distance from the tire contact patch which corresponds to a multiple of half a wavelength assigned to the resonance frequency. Due to the combination according to the invention of the normal orientation of essentially the entire first absorber membrane to the direction of sound propagation emanating from the tire contact patch, and the arrangement of the sound absorption element at a distance from the tire contact patch which corresponds to a multiple of half a wavelength assigned to the resonance frequency, the advantage is obtained that a particularly effective noise suppression is provided.

The sound absorption element preferably comprises at least one further absorber membrane arranged at a distance from the first absorber membrane, the further absorber membrane being arranged essentially in parallel to the first absorber membrane. As a result, the advantage is obtained that the resonance frequency of the sound absorption element can be tuned to the frequency range of the rolling noise which is to be dampened.

According to a preferred embodiment of the device according to the invention, a space of the sound absorption element, which is determined by two consecutive absorber membranes, is hermetically sealed and preferably filled with acoustic foam. As a result, the advantage is obtained that the dampening efficiency of the sound absorption element is improved.

Furthermore, it is preferred that a distance between the first absorber membrane and the further absorber membrane adjacent to the first absorber membrane deviates from a distance between two further absorber membranes. As a result, the mutual distances between the individual absorber membranes can be chosen such that a further frequency range of the rolling noise is dampened. In addition, tuning of the resonance frequency of the sound absorption element is thereby facilitated.

In addition, for tuning the resonance frequency of the sound absorption element, the absorber membranes preferably have varying weights per unit area. Due to the combination of varying weights per unit area of the absorber membranes and different distances between the absorber membranes, the advantage is obtained that it becomes possible to tune the sound absorption element in a wide frequency range.

According to the preferred embodiment of the device according to the invention, the device comprises a structure-borne noise converter connected to a signal processor and a microphone connected to the signal processor, the microphone preferably being arranged in the region of an end of the sound absorption element facing the roadway. Furthermore, the signal processor is preferably designed for delivering an audio signal received from the microphone to the structure-borne noise converter in a phase-shifted manner in order to generate a destructive sound interference. As a result, the advantage is obtained that active suppression of the rolling noise is provided by the device according to the invention. Optimum recording of the rolling noise is ensured by the microphone being arranged in the region of an end of the sound absorption element facing the roadway.

In the preferred embodiment, the structure-borne noise converter is arranged on a side of the first absorber membrane facing away from the tire contact patch. As a result, the advantage is obtained that the first absorber membrane is simultaneously used as a sound-generating membrane, for which reason a separate loudspeaker membrane may be omitted.

According to an alternative embodiment variant, the structure-borne noise converter is arranged on a body part of the vehicle in the area of the tire. As a result, the advantage is obtained that the structure-borne noise converter is arranged in a protected area within the vehicle.

In order to ensure optimum sound absorption by the sound absorption element at higher driving speeds, in an advantageous embodiment variant of the device according to the invention, the sound absorption element is attached to the vehicle in such a way that it is displaceable in the direction of the roadway, and it comprises an aerodynamic element designed for providing a downforce dependent on the airstream.

The device preferably comprises a positioning unit connected to the sound absorption element, the positioning unit being designed for positioning the sound absorption element in an operating position in which the first absorber membrane is oriented essentially normally to the direction of sound propagation emanating from the tire contact patch when the vehicle's driving speed increases, and for moving it out of the operating position when the driving speed decreases. As a result, the advantage is obtained that, at low driving speeds, the sound absorption element is accommodated on the vehicle in such a way that it is protected from damage, and it is used only at high driving speeds.

According to the preferred embodiment, the first absorber membrane is formed from carbon and/or kevlar and preferably has a foam core. Furthermore, the further absorber membrane is preferably formed from carbon and/or kevlar and preferably has a foam core. Those composite materials are advantageously lightweight, rigid, and resistant to harsh physical environments.

According to the preferred embodiment, the sound absorption element exhibits several resonance frequencies. As a result, the advantage is obtained that several frequency ranges can be dampened with the device according to the invention.

The sound absorption element preferably has an elastic membrane suspension, with each absorber membrane being mounted to the elastic membrane suspension in an oscillatable manner. As a result, the advantage is obtained that an oscillation as piston-shaped as possible of each absorber membrane is achieved, whereby improved sound absorption is guaranteed.

Advantageous embodiments of the device according to the invention, as well as alternative embodiment variants, are explained in further detail below with reference to the figures.

FIG. 3b shows the device according to the invention with two sound absorption elements according to FIG. 3a.

Figure 1A:
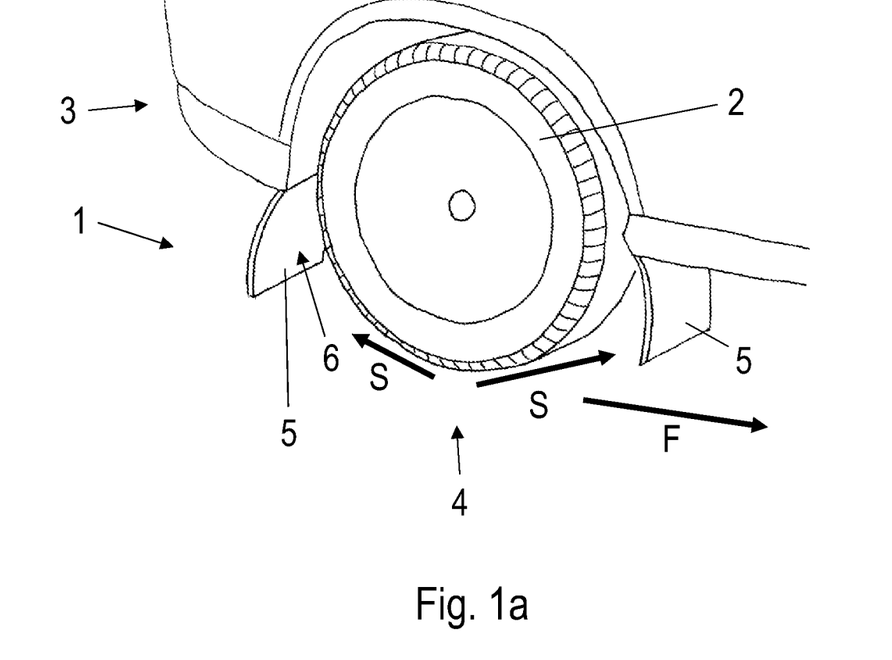
FIG. 1a shows a device according to the invention for reducing a rolling noise with two sound absorption elements.
Figure 1B:
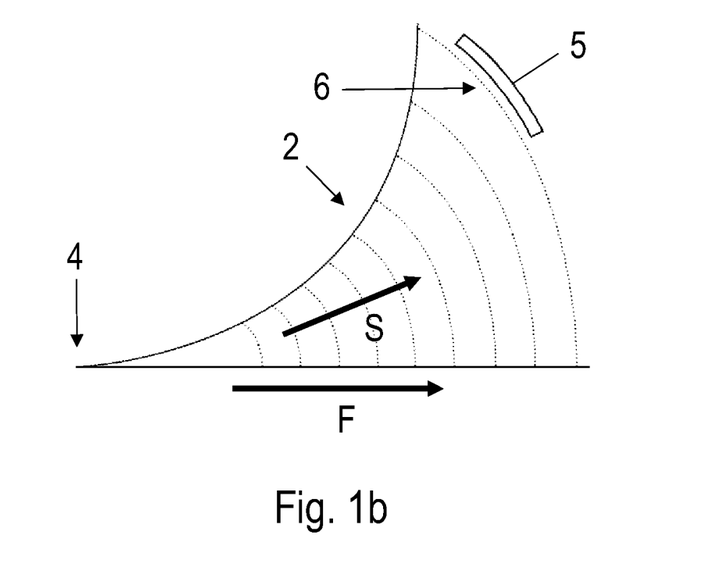
FIG. 1b and FIG. 1c show the sound propagation and the horn mouth resonances between a roadway and a tire in a schematic illustration.
Figure 1C:
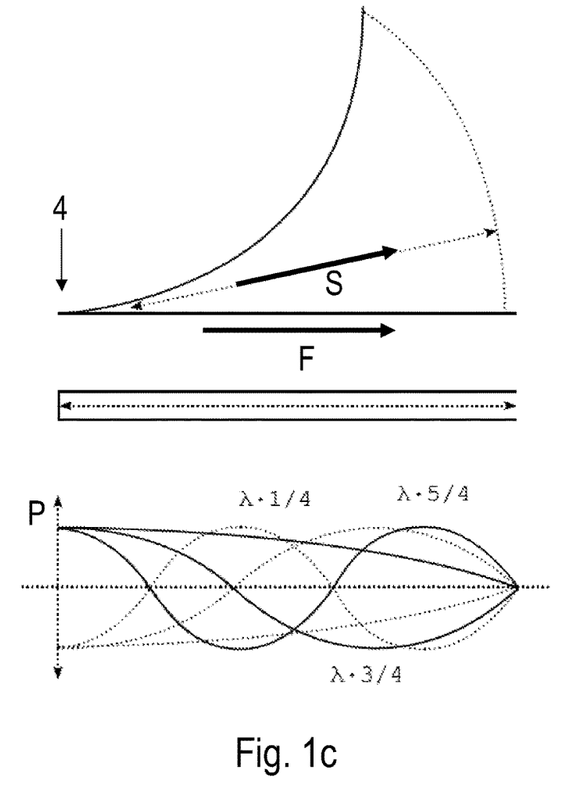

FIG. 1a shows a device 1 according to the invention for reducing a rolling noise of a vehicle 3 having at least one tire 2. In FIG. 1a, the device 1 is shown as mounted to the vehicle 3 in the area of the tire 2. The tire 2 rolls on a tire contact patch 4 on a roadway, which is not depicted separately in FIG. 1a. The tire contact patch 4 constitutes the contact surface of the tire 2 with the roadway. Any vehicle 3 that has at least one tire 2 rolling on a roadway, such as, for example, passenger vehicles, trucks, single-track vehicles, rail vehicles, buses, trams, subways and the like, can be considered as a vehicle 3. In the case of rail vehicles, the roadway is formed by the rail. In the driving mode, the tire 2 rolling on the roadway creates a rolling noise which is dependent on the vehicle weight, the driving speed, the profile design of the tire 2, the tire width, the tire pressure, the tire material, and other influencing factors. The device 1 according to the invention comprises a sound absorption element 5 attached to the vehicle 3 in front of, behind and/or to laterally of the tire contact patch 4 in the direction of travel. In FIG. 1a, the device 1 is illustrated in the preferred embodiment with two sound absorption elements 5, with one sound absorption element 5 being attached in front of the tire contact patch 4 in a direction of travel F of the vehicle 3 and one sound absorption element 5 being attached behind it in the direction of travel F. The sound absorption element 5 has at least one resonance frequency. According to a preferred embodiment variant, the sound absorption element 5 exhibits several resonance frequencies. The resonance frequencies are defined by the materials used for the sound absorption element 5 and by its internal structure. The sound absorption element 5 has a curved first absorber membrane 6 facing the tire contact patch 4. FIG. 1b schematically shows the sound propagation between the roadway and the tire 2. As can be seen in FIGS. 1b and 1c, essentially the entire first absorber membrane 6 is oriented normally to a direction of sound propagation S emanating from the tire contact patch 4, wherein the sound absorption element 5 is located at a distance from the tire contact patch 4 which corresponds to a multiple of half a wavelength λ, assigned to the resonance frequency of the sound absorption element 5. The sound absorption element 5 is oriented in such a way that the sound waves from the tire contact patch 4 hit the first absorber membrane 6 at essentially 90°.

Figure 1D:
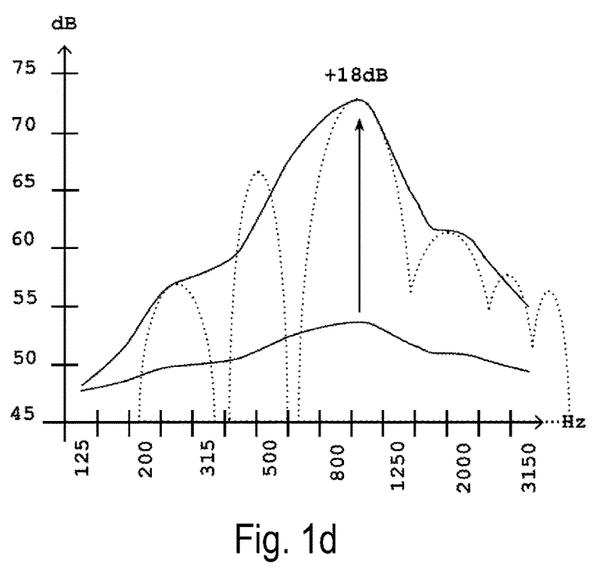
FIG. 1d shows the sound amplification of the horn effect by way of an exemplary tire.

The applicant has discovered that the tire contact patch 4 not only constitutes a sound source, but simultaneously also an acoustically hard horn neck of an acoustic horn. As can be seen in FIG. 1c, stationary sound waves occur between the tire contact patch 4 and the mouth area of the horn, similarly to a pipe closed on one side, which is shown in the middle of FIG. 1c for comparison purposes. In this case, a maximum of the sound pressure P always occurs at the horn neck, and a minimum sound pressure occurs at the horn mouth due to the change in impedance. As shown by way of example in FIG. 1d, the sums of the stationary sound waves result in an amplitude curve characteristic of the horn effect of a tire 2, which, in the example of FIG. 1d, has an amplification of +18 dB at a frequency of approx. 1000 Hz. With regard to the geometry of the vehicle 3, a local fixation of the tire contact patch 4 arises when driving straight ahead, whereby the sound pressure maxima of the stationary sound waves always occur at a certain distance from the tire contact patch 4 and thus at a precisely defined position in relation to the vehicle 3. A positioning of the sound absorption element 5 at a distance from the contact tire patch 4 which corresponds to a multiple of half the wavelength λ, assigned to the resonance frequency of the sound absorption element 5, in connection with the first absorber membrane 6 which is oriented normally to the direction of sound propagation S emanating from the tire contact patch 4 essentially on its entire surface, thus results in a significantly more effective sound suppression in comparison to the prior art.

Figure 2A:
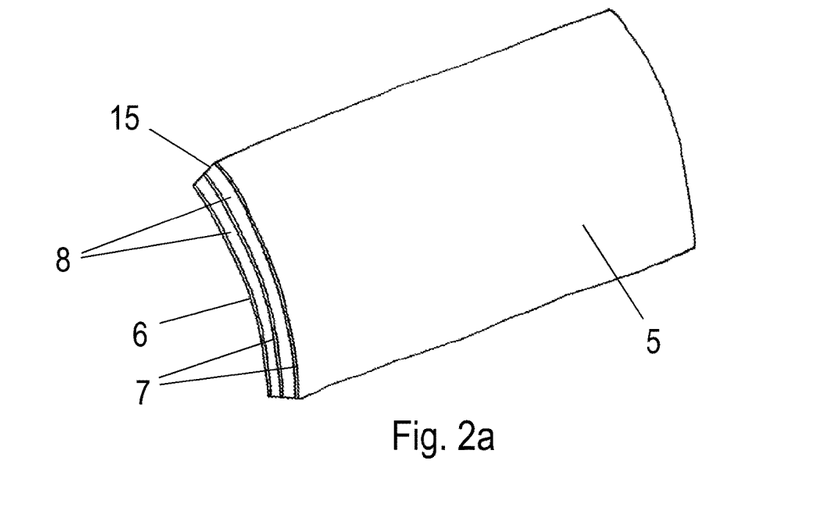
FIG. 2a shows the layered structure of the sound absorption element of the device according to the invention.

The sound absorption element 5 is preferably designed as a membrane absorber. As illustrated in FIG. 2a, the sound absorption element 5 comprises, according to the preferred embodiment of the device 1 according to the invention, at least one further absorber membrane 7 arranged at a distance from the first absorber membrane 6, with the exemplary sound absorption element 5 depicted in FIG. 2a having two further absorber membranes 7. The further absorber membrane 7 is arranged essentially in parallel to the first absorber membrane 6. According to this embodiment, a space 8 of the sound absorption element 5, which is defined by two consecutive absorber membranes 6, 7, is preferably hermetically sealed and preferably filled with an acoustic foam. In addition, a distance between the first absorber membrane 6 and the further absorber membrane 7 adjacent to the first absorber membrane 6 deviates from a distance between two further absorber membranes 7. In addition, the absorber membranes 6, 7 preferably have varying weights per unit area. By varying the mutual distances between the individual absorber membranes 6, 7, the weights per unit area of the absorber membranes 6, 7, the filling of the spaces 8 with acoustic foam and the number of absorber membranes 6, 7 provided in the sound absorption element 5, the advantage is obtained that the sound absorption element 5 can be tuned to different resonance frequencies. In addition, as illustrated in FIG. 2a, the sound absorption element 5 preferably comprises an elastic membrane suspension 15, with each absorber membrane 6,7 being mounted to the elastic membrane suspension 15 in an oscillatable manner. This elastic membrane suspension 15 is important because an absorber membrane 6, 7 rigidly mounted in the area of the tires 2 would result in a completely different oscillation behaviour of the absorber membrane 6, 7 and would have an effect only due to its deformability in the middle of the absorber membrane. It is the aim of the elastic membrane suspension 15 to enable, similarly to a loudspeaker bead, an oscillation as piston-shaped as possible of a rigid membrane or, respectively, plate.

The resonance frequency of a plate absorber generally results from:

$$f_R = \frac{600}{\sqrt{d \cdot m}}$$

Figure 2B:
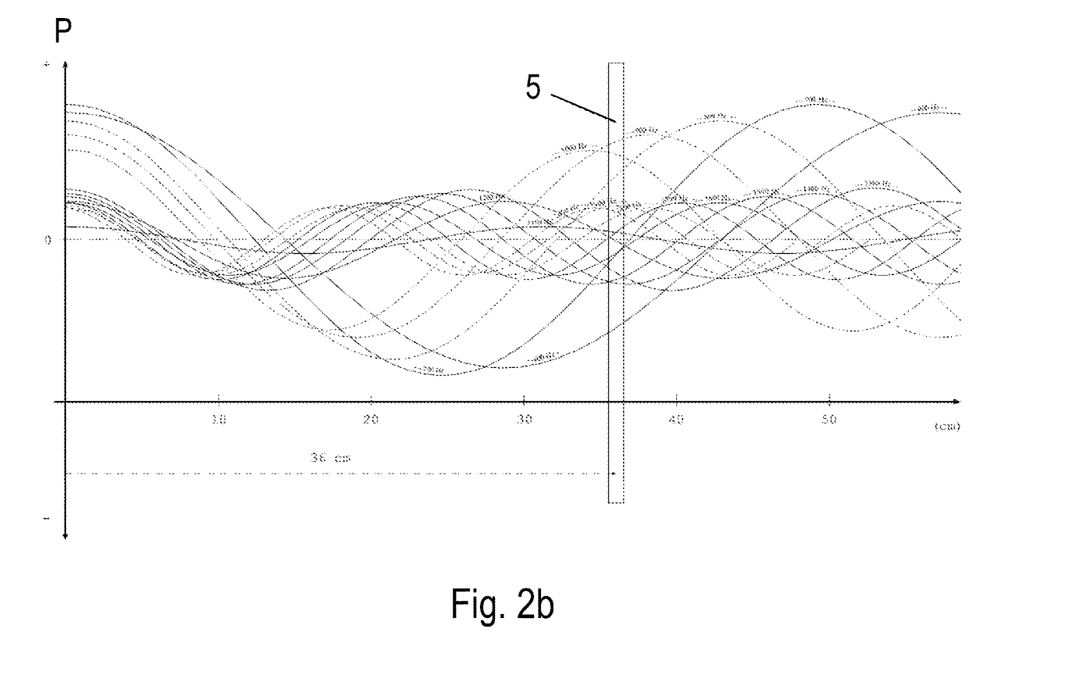
FIG. 2b shows the sound pressure curve of the horn mouth resonances using the example of a 17" tire as a function of the distance from the tire contact patch.

$f_R$ resonance frequency
d distance between two consecutive absorber membranes 6, 7
m weight per unit area of the absorber membranes FIG. 2b schematically shows the sound pressure curve of the horn mouth resonances as a function of the distance from the tire contact patch 4 of an exemplary tire 2, which has been analysed with regard to amplitude peaks. To provide optimum sound suppression, it is advantageous to position the sound absorption element 5 at positions where maxima of the sound pressure P of frequencies to be absorbed coincide and to tune its resonance frequencies to the frequencies to be absorbed. In the sound pressure curves of the horn mouth resonances as illustrated in FIG. 2b, the sound pressure maxima of the frequencies 950 Hz and 1900 Hz are located, for example, at a distance of approx. 36 cm. In this way, a multiple narrow-band absorption of the rolling noise can be achieved with an absorber element composed of several absorber membranes 6, 7.

Figure 3A:
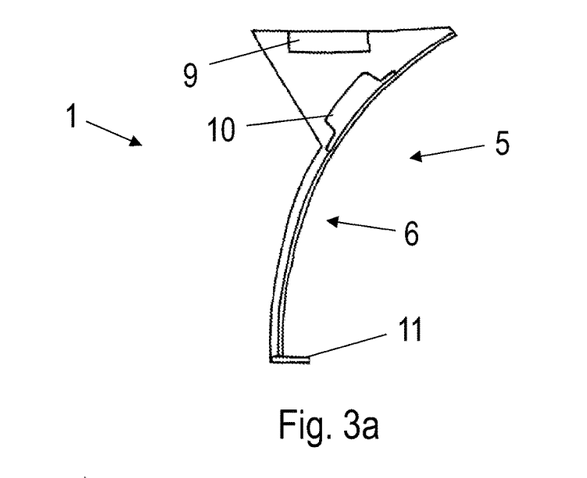
FIG. 3a shows a sectional view of the sound absorption element of the device according to the invention with active noise suppression.
Figure 3B:
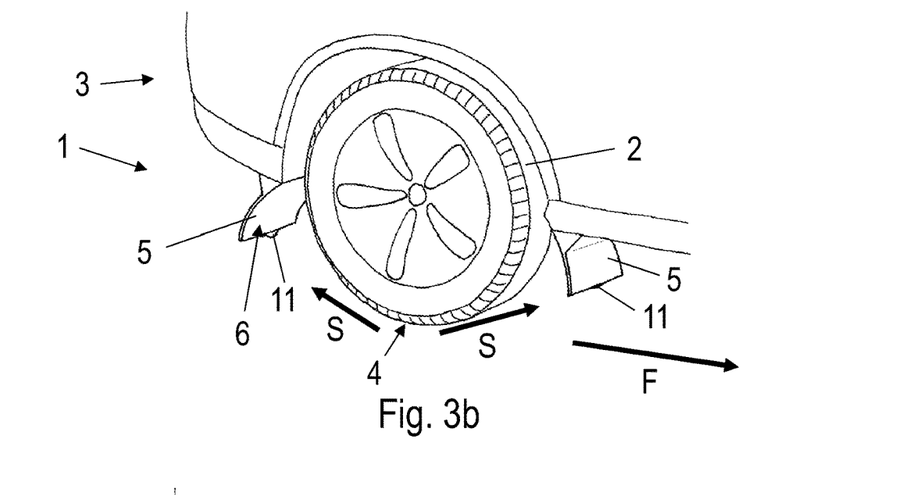

FIG. 3a shows the device 1 according to the invention in an alternative embodiment variant with active noise suppression, with the device 1 illustrated in FIG. 3a comprising a structure-borne noise converter 10 connected to a signal processor 9 and a microphone 11 connected to the signal processor 9. The microphone 11 is preferably arranged in the region of an end of the sound absorption element 5 facing the roadway. FIG. 3b shows the device 1 according to the invention as per FIG. 3a with two sound absorption elements 5 attached to a vehicle 3. As a result, the advantage is obtained that the microphone 11 is less influenced by engine noise. The signal processor 9 processes an audio signal received from the microphone 11 and delivers it to the structure-borne noise converter 10 in a phase-shifted manner. As a result, a destructive sound interference is generated between the rolling noise and the phase-shifted audio signal output by the structure-borne noise converter 10. This leads to an extensive reduction in the acoustic power of the rolling noise.

The structure-borne noise converter 10, as illustrated in FIG. 3a, is preferably arranged on a side of the first absorber membrane 6 facing away from the tire contact patch 4. As a result, the structure-borne noise converter 10 is arranged inside the sound absorption element 5 in such a way that it is protected from damage. In addition, in this case, the first absorber membrane 6 is simultaneously used as a sound-generating membrane.

Figure 3C:
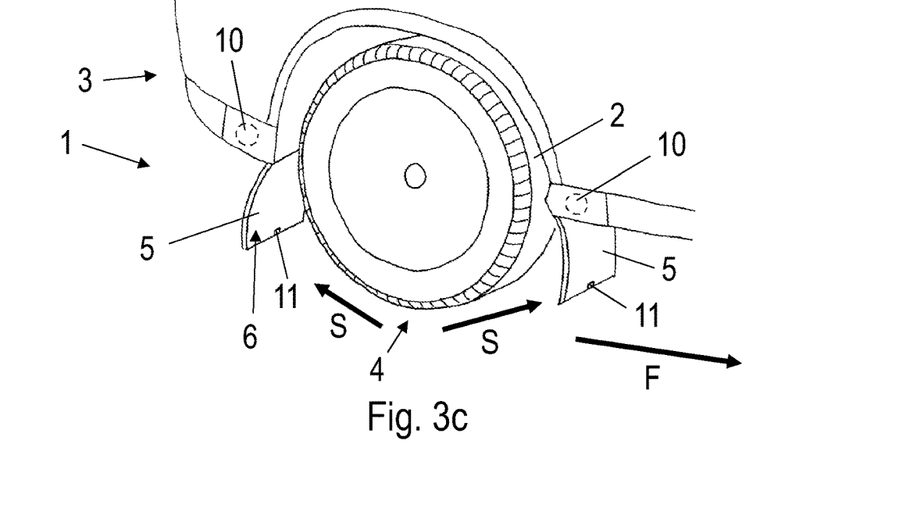
FIG. 3c shows the device according to the invention with two sound absorption elements with active noise suppression in an alternative embodiment variant.

FIG. 3c shows a further embodiment of the device 1 according to the invention with two sound absorption elements 5, which provides active noise suppression. In this embodiment variant, the structure-borne noise converter 10 is arranged on a body part of the vehicle 3 in the area of the tire 2. As a result, the structure-borne noise converter 10 is arranged inside the vehicle 3 in such a way that it is protected from damage. In addition, in this case, the body of the vehicle 3 is used as a sound-generating membrane.

Figure 4:
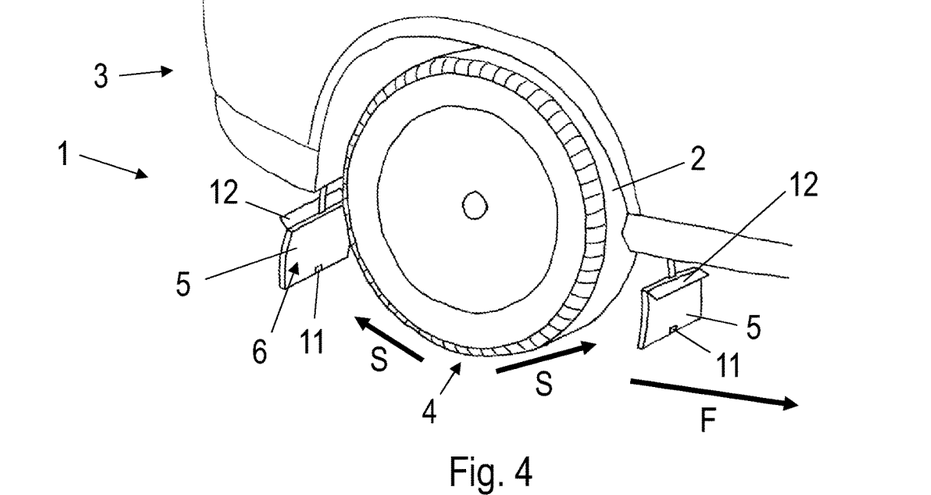
FIG. 4 shows a further embodiment variant of the device according to the invention with aerodynamic elements arranged on the sound absorption elements.

FIG. 4 shows a further embodiment variant of the device 1 according to the invention with two sound absorption elements 5, each of the two sound absorption elements 5 being attached to the vehicle 3 in such a way that it is displaceable in the direction of the roadway. In addition, one of the two, or, as shown in FIG. 4, both sound absorption elements 5, has/have one aerodynamic element 12 each, which is designed for providing a downforce dependent on the airstream. The aerodynamic element 12 acts like a spoiler as it is generally known from vehicle construction, which causes the sound absorption element 5 to be displaced while driving. As a result, the advantage is obtained that the sound absorption element 5 can be brought closer to the roadway while driving, whereby sound reflections from the roadway are reduced. The embodiment variant of the device 1 according to the invention as illustrated in FIG. 4 may additionally include active noise suppression, which has been explained with reference to FIG. 3a, FIG. 3b and FIG. 3c.

Figure 5:
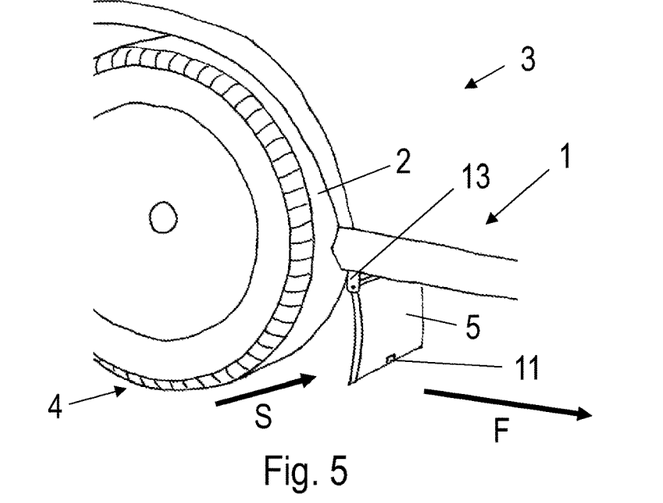
FIG. 5 shows the device according to the invention with a positioning unit.

FIG. 5 shows the device 1 according to the invention in a further embodiment variant with a positioning unit 13 connected to the sound absorption element 5. At an increasing driving speed of the vehicle 3, the positioning unit 13 positions the sound absorption element 5 at an operating position as illustrated in FIG. 5, in which the first absorber membrane 6 is oriented essentially normally to the direction of sound propagation S emanating from the tire contact patch 4. At a decreasing driving speed, the positioning unit 13 moves the sound absorption element 5 out of the operating position. As a result, the advantage is obtained that, at low driving speeds, the sound absorption element 5 is accommodated on the vehicle 3 in such a way that it is protected from damage, and it is used only at high driving speeds. The positioning unit 13 shown by way of example in FIG. 5 comprises a pivot bearing for pivoting the sound absorption element 5 out of the operating position.

Figure 6:
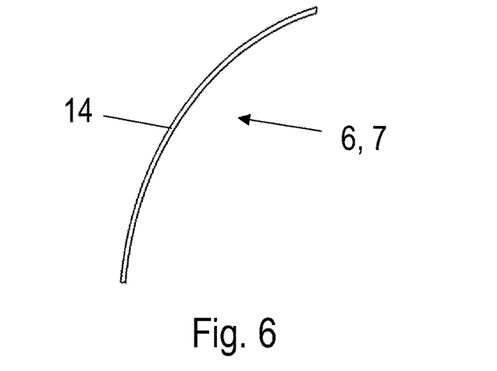
FIG. 6 shows a sectional view of a first absorber membrane or, respectively, a further absorber membrane of the device according to the invention.

In FIG. 6, the first absorber membrane 6 or, respectively, the further absorber membrane 7 is illustrated. According to the preferred embodiment, the first absorber membrane 6 is preferably formed from carbon and/or kevlar and preferably has a foam core 14. Furthermore, the further absorber membrane is preferably formed from carbon and/or kevlar and preferably has a foam core 14. Those composite materials are advantageously lightweight, rigid, and resistant to harsh physical environments.

Figure 7:
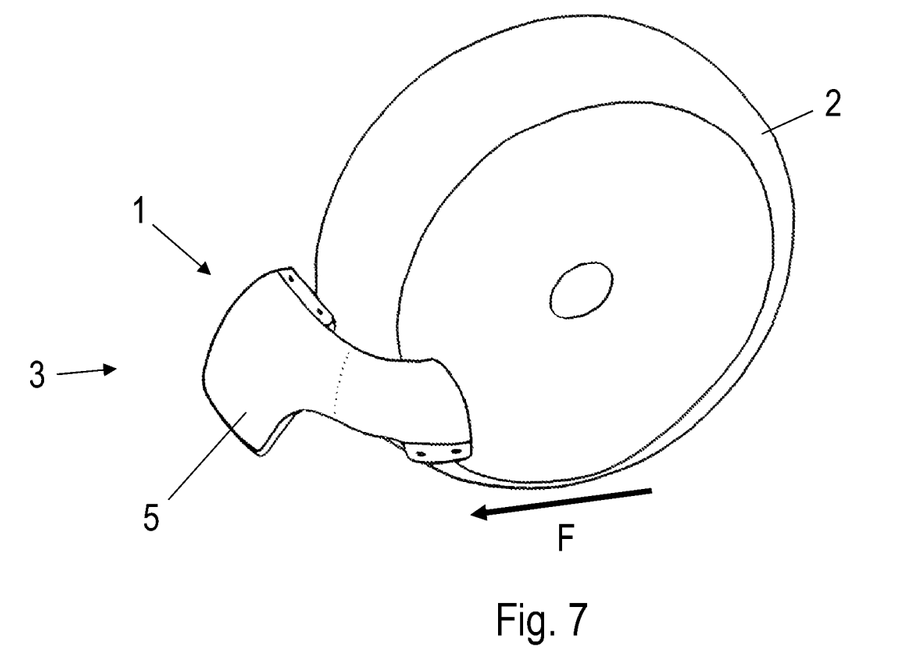
FIG. 7 shows an embodiment variant of the device according to the invention with a 3-dimensionally bent sound absorption element.

FIG. 7 shows an embodiment variant of the device 1 according to the invention with a curved sound absorption element 5, which is arranged in the area of the tire 2 in front of and partly laterally of the tire 2 in the direction of travel F. According to a further embodiment variant, the sound absorption element 5 can encompass the tire 2 also in the shape of a semicircle and can thus be arranged in front of, behind and laterally of the tire contact patch 4.

The invention claimed is:

1. A vehicle comprising at least one tire and comprising a device for reducing a rolling noise of the at least one tire, the tire rolling on a roadway on a tire contact patch, wherein the device comprises at least one sound absorption element attached to the vehicle in front of, behind and/or laterally of the tire contact patch in a direction of travel (F) of the vehicle and having at least one resonance frequency and a curved first absorber membrane facing the tire contact patch, wherein the entire first absorber membrane is oriented normally to a direction of sound propagation (S) emanating from the tire contact patch, and the sound absorption element is located at a distance from the tire contact patch which corresponds to a multiple of half a wavelength ($\lambda$) assigned to the resonance frequency.

2. A vehicle according to claim 1, wherein the at least one sound absorption element comprises at least one further absorber membrane arranged at a distance from the first absorber membrane, the further absorber membrane being arranged in parallel to the first absorber membrane.

3. A vehicle according to claim 2, wherein a space of the at least one sound absorption element, which is defined by two consecutive absorber membranes is hermetically sealed and filled with acoustic foam.

4. A vehicle according to claim 2, wherein a distance between the first absorber membrane and the further absorber membrane adjacent to the first absorber membrane deviates from a distance between two further absorber membranes.

5. A vehicle according to claim 2, wherein the absorber membranes have varying weights per unit area.

6. A vehicle according to claim 2, wherein the further absorber membrane is formed from carbon and/or kevlar and has a foam core.

7. A vehicle according to claim 1, wherein the device comprises a structure-borne noise converter connected to a signal processor and a microphone connected to the signal processor, the microphone being arranged in the region of an end of the sound absorption element facing the roadway.

8. A vehicle according to claim 7, wherein the signal processor is operable to deliver an audio signal received from the microphone to the structure-borne noise converter in a phase-shifted manner in order to generate a destructive sound interference.

9. A vehicle according to claim 7, wherein the structure-borne noise converter is arranged on a side of the first absorber membrane facing away from the tire contact patch.

10. A vehicle according to claim 7, wherein the structure-borne noise converter is arranged on a body part of the vehicle in the area of the tire.

11. A vehicle according to claim 1, wherein the at least one sound absorption element is attached to the vehicle in such a way that it is displaceable in the direction of the roadway, and it comprises an aerodynamic element designed for providing a downforce dependent on the airstream.

12. A vehicle according to claim 1, wherein the device comprises a positioning unit connected to the at least one sound absorption element, the positioning unit operable to position the at least one sound absorption element in an operating position in which the first absorber membrane is oriented normally to the direction of sound propagation emanating from the tire contact patch when the vehicle driving speed increases, and for moving the at least one sound absorption element out of the operating position when the driving speed decreases.

13. A vehicle according to claim 1, wherein the first absorber membrane is formed from carbon and/or kevlar and has a foam core.

14. A vehicle according to claim 1, wherein the at least one sound absorption element exhibits several resonance frequencies.

15. A vehicle according to claim 1, wherein the sound absorption element has an elastic membrane suspension, with each absorber membrane being mounted to the elastic membrane suspension in an oscillatable manner.

* * * * *